United States Patent Office 3,829,497
Patented Aug. 13, 1974

---

3,829,497
PREPARATION OF 1,4-BIS (PHENYL-GLYOXALOYL) BENZENE
Stanley E. Wentworth, Bedford, Mass., assignor to the United States of America as represented by the Secretary of the Army
No Drawing. Filed Sept. 5, 1972, Ser. No. 286,398
Int. Cl. C07c 49/76
U.S. Cl. 260—590                           3 Claims

ABSTRACT OF THE DISCLOSURE

A method for the preparation of 1,4-bis (phenylglyoxaloyl) benzene comprising the steps of (a) reaction of cuprous phenylacetylide and p-diiodobenzene in the presence of hexamethylphosphoramide to produce p-bis (phenylethynyl) benzene, and (b) the oxidation of p-bis (phenylethynyl) benzene with N-bromosuccinimide in the presence of dimethylsulfoxide to produce 1,4-bis (phenylglyoxaloyl) benzene.

---

The invention described herein may be manufactured, used, and licensed by or for the Government for governmental purposes without the payment to me of any royalty thereon.

This invention relates to an improved method for producing 1,4-bis(phenylglyoxaloyl) benzene.

1,4-bis (phenylglyoxaloyl) benzene is utilized as a precursor in the reaction with aromatic tetraamines to produce high temperature resistant polyphenylquinoxaline resins. The current high cost of these high temperature resistant resins is due, in part, to the high cost incurred in the preparation of the precursor 1,4-bis (phenylglyoxaloyl) benzene.

It is an object of the present invention to provide and disclose an improved method for the production of 1,4-bis (phenylglyoxaloyl) benzene.

It is a further object of the present invention to provide and disclose an improved method which results in higher yield of 1,4-bis (phenylglyoxaloyl) benzene than heretofore obtainable.

Other objects and a fuller understanding of the invention may be had by referring to the following description and claims.

In a specific example, 5.0 grams of cuprous phenylacetylide and 5.05 grams of p-diiodobenzene were dissolved in 125 ml. of hexamethylphosphoramide. The cuprous phenylacetylide was prepared from phenylacetylene in quantitative yield using the procedure of C. E. Castro, E. J. Gaughan and D. C. Owsley, J. Org. Chem., 31 4071 (1966). The resultant mixture was heated in a laboratory flask to a temperature of about 120–130° C. under an inert atmosphere of argon, and maintained at that temperature for a period of about 16 hours. The mixture was allowed to cool and then poured into about 800 ml. of water. The resulting precipitate was removed by filtration, dried, and recrystallized from heptane to yield 3.10 grams, i.e., about 73% of theoretical, of p-bis (phenylethynyl) benzene.

In the second step of the process, 1.0 gram of p-bis (phenylethynyl)benzene, prepared as described, and 2.58 grams of N-bromosuccinimide were positioned in a flask containing about 30 ml. of dimethylsulfoxide which was freshly distilled from $CaH_2$. The mixture was stirred for a period of about 16 hours at room temperature. A pale-yellow precipitate was recovered by filtration. On drying, 1.18 grams, i.e., about 100% of the theoretical, of p-bis (phenylglyoxaloyl) benzene, containing a small amount of dimethylsulfoxide was recovered. The structure was confirmed by infrared analysis.

Although I have described my invention with a certain degree of particularity, it is understood that the present disclosure has been made only by way of example and that obvious modifications will occur to a person skilled in the art.

Having described my invention, I claim:
1. A method for the production of 1,4-bis(phenylglyoxaloyl) benzene comprising reacting p-bis(phenylethynyl) benzene at room temperature with a stoichiometric excess of N-bromosuccinimide in the presence of an effective amount of dimethylsulfoxide as a solvent and oxidizing agent.
2. A method according to claim 1 in which the product is recovered by the addition of a precipitating agent.
3. A method according to claim 2 in which the precipitating agent is water.

References Cited
UNITED STATES PATENTS
3,321,525    5/1967    Griesbaum et al. ____ 260—590

OTHER REFERENCES
Ogliaruso et al.: Chemical Abstracts, 63, 14727g (1965).

DANIEL D. HORWITZ, Primary Examiner

U.S. Cl. X.R.
260—668 R